UNITED STATES PATENT OFFICE.

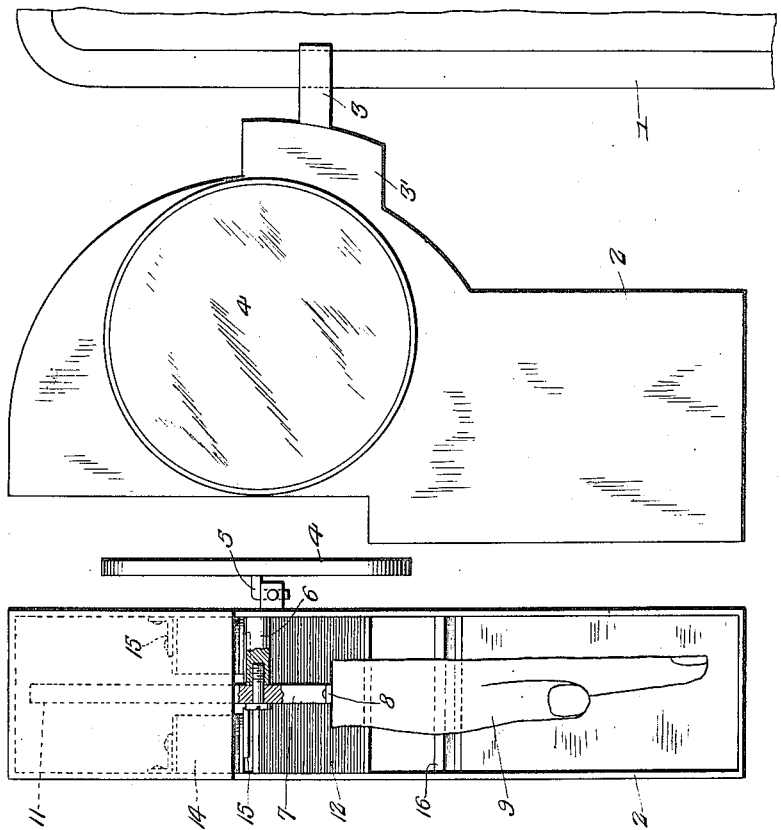

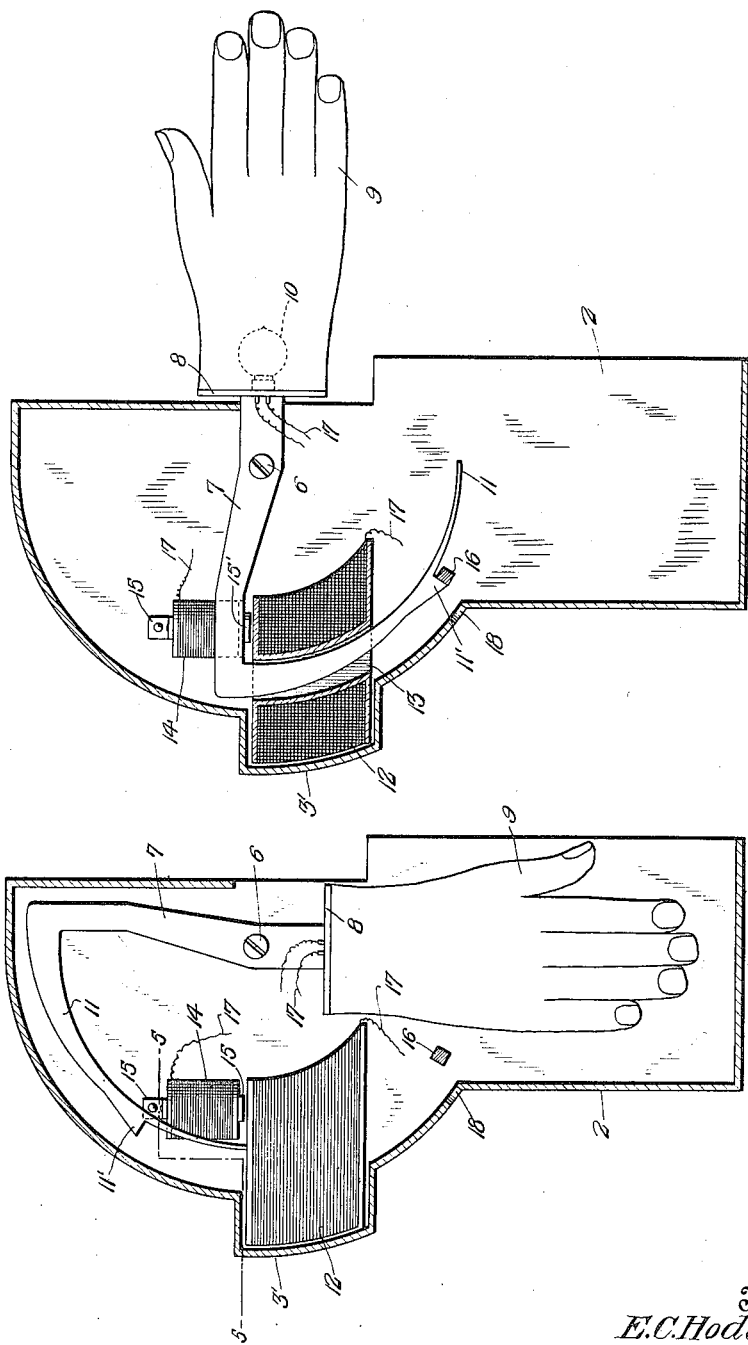

ELVIN C. HODGES, OF CAMBRIDGE, MASSACHUSETTS.

TRAFFIC-SIGNAL.

1,380,801.  Specification of Letters Patent.  Patented June 7, 1921.

Application filed May 9, 1919. Serial No. 295,860.

*To all whom it may concern:*

Be it known that I, ELVIN C. HODGES, a citizen of the United States, residing at Cambridge, in the county of Middlesex and State of Massachusetts, have invented new and useful Improvements in Traffic-Signals, of which the following is a specification.

This invention relates to signaling means for automobiles and the principal object of the invention is to provide means for indicating when the automobile is to make a turn and to render it unnecessary for the driver to throw out his arm to give the signal.

Another object of the invention is to provide electrical means for moving the signal into inoperative position.

Still another object of the invention is to provide magnetic means for holding the signal in operative position.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a front view of the device showing the same attached to the inner shield of an automobile;

Fig. 2 is an edge view partly in section;

Fig. 3 is a longitudinal sectional view with a signal hand in raised position;

Fig. 4 is a like view with the device in lowered position;

Fig. 5 is a cross section on the line 5—5 of Fig. 4.

In these views 1 indicates a part of the frame of the wind shield of an automobile and 2 indicates the case which contains the parts of the invention, said case being secured to the wind shield by means of the brackets 3. The case is of substantially rectangular shape at its lower part while its upper portion is of substantially semi-circular formation with a projecting part 3' intermediate its ends. One side of the case carries a mirror 4 which is connected with the case by means of the brackets 5. Within the case is a shaft 6 on which the arm 7 is pivoted. At its outer end said arm is provided with a cross piece 8 to which the signal hand 9 is fastened. This hand is made of transparent material and is hollow and receives an electric lamp 10. The other end of the arm is formed with a curved extension 11 and this extension is of tapered formation, as shown. A solenoid 12 is located in the case with a portion thereof seated in the recess formed by the projection 3'. The center recess 13 of this solenoid is adapted to receive the curved extension 11 of the arm and a pair of electromagnets 14 are supported above the solenoid by the brackets 15. The poles of these members are at the bottom thereof, as shown at 15', and these magnets are spaced apart so as to receive the arm between them. The extension 11 is provided with a projection 11' which is adapted to engage with an iron bar 16 when the signal is in operative position, and the arm being magnetized, it will grip the bar and hold on to the same until the circuit is broken. The wires 17 connected with the magnets, the solenoid and the lamp, pass through an opening 18 in the case and lead to the source of supply, switches or the like being inserted in the circuit for controlling the same.

It will thus be seen that when the driver wishes to make a turn he will operate the switch to complete the circuit to the magnet and lamp. The solenoid will thus attract the extension 11 so as to force the same through the solenoid and thus raise the hand. Due to the tapered shape of the extension the pulling power is increased as the hand moves upwardly. As the main part of the arm moves downwardly, between the magnets, it will finally be gripped by the poles of said magnets and the projection 11' will engage the bar 16 and thus the arm and extension will be held in the lowered position with the end in raised position and the lamp in the hand will be lighted. The parts will remain in this position until the switch is turned off. When the circuit is broken the weight of the hand will cause the parts to assume their original position. If desired, I may operate the switch by one of the actuating levers of the automobile.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a casing, an arm pivoted therein, a signal connected with one end of the arm, a curved extension on the other end of the arm, a solenoid in the casing to which the extension is adapted to pass, a pair of electro-magnets arranged in the casing above the solenoid, said magnets being spaced apart to receive the arm between them for holding said arm in operative position, said extension having a projection adjacent its lower end and a magnetized bar in said casing for engaging said projection and thus helping the magnets to hold the signal arm in operative position.

In testimony whereof I affix my signature

ELVIN C. HODGES